United States Patent [19]

Rajakovics

[11] 4,223,696

[45] Sep. 23, 1980

[54] APPARATUS FOR THE PURPOSE OF AVOIDING PRESSURE DROP BETWEEN A GASEOUS OR VAPOROUS PHASE AND A LIQUID PHASE

[76] Inventor: Gundolf E. Rajakovics, Anzengruberstr. 14, Leoben, (Steiermark), Austria

[21] Appl. No.: 887,862

[22] Filed: Mar. 20, 1978

[30] Foreign Application Priority Data

Mar. 21, 1977 [AT] Austria ................................ 1942/77

[51] Int. Cl.² ............................................. F17C 1/00
[52] U.S. Cl. ..................................... 137/206; 137/572
[58] Field of Search ................. 137/206, 209, 210, 572

[56] References Cited

U.S. PATENT DOCUMENTS

| 3,780,761 | 12/1973 | Whitson | 137/572 X |
| 3,894,554 | 7/1975 | Mangus | 137/206 |

Primary Examiner—Alan Cohan

[57] ABSTRACT

The apparatus comprises a first chamber in which there is present a gaseous or vaporous medium under pressure and a second chamber which is predominantly filled with a liquid medium under a pressure independent from the pressure in the first chamber. In addition to these two chambers an intermediate chamber is filled in normal operation with substantially the same gaseous or vaporous medium at substantially the same pressure as present in the first chamber. The first chamber is connected through ducts via the intermediate chamber with the second chamber and at normal operation an unavoidable predetermined pressure drop is caused between said intermediate chamber and said second chamber. The pressure regulation is effected by a piston-operated shut off device adapted to assume an open and a closed position which device is disposed between the first and second chamber. The pressure present in the second chamber through the duct means will act on one end of the piston by means of the liquid medium present in the second chamber. The shut-off device is thereby moved into the normal open position. The pressure present in the first chamber by means of the connecting duct acts on the other end of the piston and will cause the shut-off device to move into the closed position if the pressure differential between the two pressures exceeds the predetermined pressure drop by a predetermined value. This will close the shut-off device and thus prevent an overrun from the first into the second chamber because of an excessive pressure drop in the second chamber.

10 Claims, 4 Drawing Figures

APPARATUS FOR THE PURPOSE OF AVOIDING PRESSURE DROP BETWEEN A GASEOUS OR VAPOROUS PHASE AND A LIQUID PHASE

BACKGROUND OF THE INVENTION

In the chemical industry installations are quite common for instance in laboratories or in evaporation installations in which a gaseous or vaporous phase is in contact with a liquid phase. In these installations it is often desirable in case of a sudden pressure drop in the liquid phase to interrupt the access of the other phase to the liquid phase and thus to prevent a pressure drop in the gaseous phase. An example of such installations are, for instance, evaporation installations for radioactive waste waters.

In this latter type of installation the evaporation process is based on the fact that the radioactivity of the waste waters is tied to materials present in solution or undissolved in the water which themselves are not volatile, so that in case of an evaporation they remain in the liquid phase and can there be concentrated. The formed water vapor in the ideal case should contain no radioactivity at all. In practical application there are always more or less drops entrained by the vapor stream which have the same composition as the radioactive liquid which is subjected to vaporization. The carriers of the radioactive activity are thus entrained in the steam drops and during condensation will enter the formed distillate.

If, in these cases, the pressure in the liquid phase of the condenser is subject to a sudden drop, a vigorous steam formation in the evaporator will be the consequence and this will result in high vapor flow speeds and the entrainment of larger amounts of liquid. The distillate then will have an unacceptably high radioactivity.

Analogous problems can arise in various installations in the chemical industry.

It has already been proposed to employ regulating devices in gas or steam ducts which are controlled by the pressure at a specific point of the installation. These prior art devices are, however, not very suitable for the present purpose since in them usually there is a substantial delay in effecting the control action. Besides, there is the difficulty that in case of a power failure the power supply to the control device is likewise interrupted and valuable time may be lost until an emergency power source may be started and the switch-over to such device is effected.

Under a broad aspect the present invention therefore involves the problem to avoid a pressure drop in a system A when the pressure in a system B, for reasons outside the pressure in A is subject to a quick drop. In this case the system A would be filled with a gaseous or vaporous medium under pressure which through an intermediate system A' (which in normal operation is filled with the same medium as the system A at approximately the same pressure) would normally flow into the system B which predominantly is filled with a liquid medium and is under a pressure not dependent on the pressure in the system A. Between the systems A and B there is a pressure equilibrium.

It is therefore the object of the present invention to prevent a sudden pressure drop in the A phase due to an unexpected pressure drop in the liquid phase (phase B).

SUMMARY OF THE INVENTION

The problem of the invention is solved by providing a piston operated shut-off device between the first pressure system A and the intermediate system A'. One end of the piston is acted on by the liquid medium and its pressure in the system B, and this causes the opening of the shut-off device.

The other side of the piston is acted on by the pressure in the first system which causes the closing of the shut-off device.

In other words, the differential of the two pressures acting on the piston, in cooperation with other forces acting thereon, will form a resultant force which in normal operation causes the opening of the shutoff device and in case of an increase of the pressure drop at the passage between the intermediate system A' and the second system B by a predetermined value due to a pressure drop in the system B, will cause the closing of the shutoff device.

The apparatus of the invention accordingly is based on the fact that the pressure will drop much slower in A because of the partial expansion of the gaseous or vaporous phase. The piston, thus, will respond to the pressure drop in B virtually without any time delay.

For specific cases it may be advisable to provide a throttle member in the system A' to delay the expansion just referred to.

An advantage of a specific embodiment of the invention is that the entire apparatus forms part of the overall system so that the requirement for seals towards the exterior atmosphere are dispensed with. This is particularly important in case of the treatment of radioactive waste waters in vaporizers and in case of the handling of poisonous media.

The invention itself, however, both as to its construction and its method of operation, together with additional objects and advantages thereof, will be best understood from the following description of specific embodiments when read in connection with the accompanying drawing.

DETAILS OF THE INVENTION AND PREFERRED EMBODIMENTS

Figure 1:
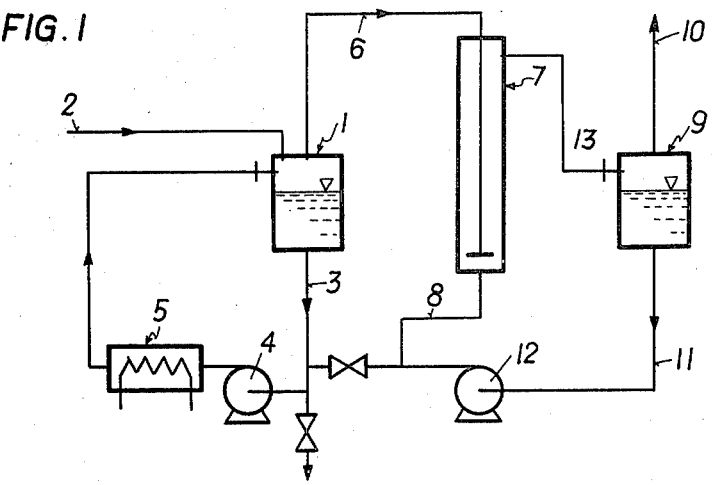
FIG. 1 is a general schematic view of a device for the evaporation, particularly of radioactive liquids.

With reference first to FIG. 1 it will be seen that this installation includes two evaporator stages.

The first evaporator stage comprises a steam expansion evaporator 1 into which the duct 2 passes the feed liquid. This liquid is then passed through the duct 3 into a circulating pump 4 whereupon it flows through a heat exchanger 5 to raise its temperature and finally flows again into the steam expansion evaporator where part of the liquid will evaporate through the heat released by the pressure drop. This vapor is then passed through a vapor duct 6 into a mixing condenser 7 where it is subject to condensation. The thus formed fluid mixture is passed through a duct 13 to a second steam expansion evaporator 9 which forms the second evaporation stage. This evaporator is provided with a steam duct 10 and a liquid duct 11. The latter leads to a circulating pump 12 which passes the liquid through duct 8 back to the mixing condenser 7.

In this installation the circulating pump 12 of the second vaporizing stage will generate a counter pressure in the condenser 7 which approximately is of the same size as the pressure in the vapor duct which passes from the first evaporator stage to the condenser. This counter pressure will drop out in case of a failure of the circulation pump 12 in the second evaporator stage. Thus, the pressure in the vapor duct 6 of the first evaporator stage will then be subject to an almost immediate drop to the pressure level of the second evaporator stage.

The consequences are these: The liquid which should be concentrated by evaporation in the first stage has a temperature corresponding to the original pressure. Because of the sudden large pressure drop it will be subject to a rapid uncontrolled evaporation thereby causing the danger that large amounts of the liquid may be entrained into the second evaporator stage and may contaminate the latter. There will then be necessary decontamination work resulting in the shut-down of the installation.

Figure 2:
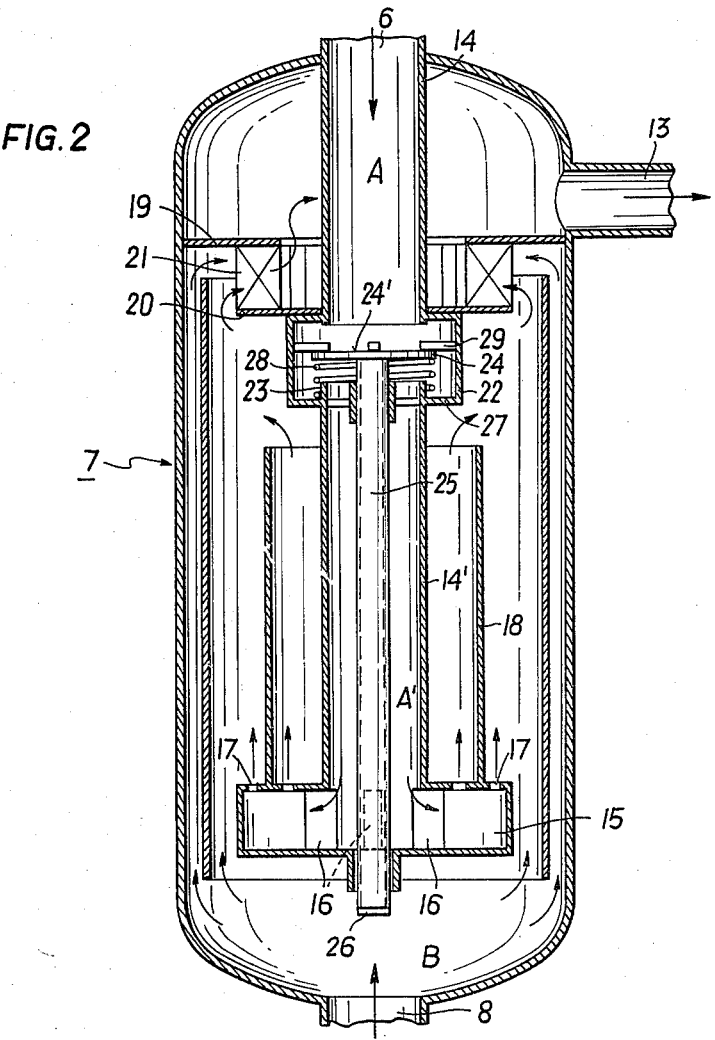
FIG. 2 shows in greater detail the intermediate condenser and the shut-off valve associated therewith.

It is therefore desirable to prevent an uncontrolled evaporation of the liquid in the first evaporator stage in case of failure of the circulation pump of the second evaporator stage. According to the invention this is accomplished by the shut-off valve which may, for instance be disposed in the condenser 7 and is illustrated in greater detail and at an enlarged scale in FIG. 2.

As the latter figure shows the vapor to be condensed is passed into the condenser from the top by means of a duct 14 and then passes into a central tube 14' which leads into a distributer 15 which is provided with channels 16 arranged in star-shape and in connection with the central tube 14'. The distributor 15 is provided with upwardly directed bores 17 which are arranged in two rows. Between the rows there is provided a tubular metal sheet 18 serving as a baffle which prevents a merging of the vapor streams leaving the bores 17 in the different rows. Thus, a complete condensation is made possible.

Above the tubular metal sheet vane 18 there are provided two spaced metal sheet rings 19 and 20 of which one directly connects with the duct 14, while the other is firmly attached to the outer wall of the condenser. The ring 20 is provided with an open space between its edge and the outer wall of the condenser, and the ring 19 is provided with a similar open space between it and the duct 14. The area between the two rings 19 and 20 constitutes the zone 21 for the post-condensation.

If in this installation the liquid pressure in the condenser 7 drops, the vapor amount flowing through the bores 17 will increase and the vapor pressure in the space A which corresponds to the evaporator 1 will drop. This will cause a violent vapor generation by which liquid drops may be entrained into the condenser.

This is prevented by connecting the duct 14 and the central tube 14' by means of a casing 22 below the metal ring 20 into said casing tube 14' is partly extending. This part of the tube which extends into the housing 22 forms the seat 23 for a disk valve 24 which in turn is connected with a tube 25. The latter extends into the central tube 14' and the distributor 15, preferably with clearance in the distributor. At its lower end tube 25 is provided with a plate 26. The pressure of the liquid in the chamber B acts on the plate 26 and the piston of which the valve disk 24, the tube 25 and the plate 26 form a part.

The central face 24' of equal size with plate 26, in normal operation of the evaporation installation is exposed to the only slightly larger pressure of the steam in the space A. Between the valve disk 24 and the floor 27 of the case 22, a pressure spring 28 is provided which equalizes the weight of the piston 24, 25 and 26 and additionally in normal operation presses the valve disk 24 against the abutments 29.

Should the liquid pressure in the condenser 7 and accordingly also in the space B drop suddenly, for instance by failure of the pump 12, this would result in an elimination of the pressure acting against the plate 26 of the piston. On the other hand the vapor pressure acting on the central face 24' of the valve disk 24 will drop more slowly because of post-evaporation. The difference between the pressures acting on the surfaces 26 and 24' therefore increases rapidly. This will overcome the force of the spring 28 and also the inertia moment of the piston parts 24, 25, 26. Thus, the valve 23, 24 will be closed.

As a consequence the steam present in the tube 14' will flow out and the pressure in the system A' will equalize to the pressure in the system B. The pressure of the system A will therefore impress almost the total face of the valve disk 24 so as to cause the valve to close.

In one of the embodiments the valve disk 24, the tube 25 and the lid or plate 26 had a weight of about 20 kg. The spring 28 then exerted in the position as shown in the drawing a force of 300 N so that the valve disk 24 in normal operation was pressed against the abutments with a force of 100 N. In case of a drop of the pressure in the liquid phase and the pressure difference reaching 0.5 bar, the vapor pressure acting on the valve disk 24 in the area of the tube 25 would predominate and would have a force of 240 N. This would result in an acceleration of the valve 24 and tube 25 in the direction of the closure of the valve by 6 m.s.$^{-2}$. In case of a valve stroke of 0.1 m, the time for closing the valve would be 0.18 seconds. The force exerted by the steam pressure upon the closed valve in case of a pressure difference of 0.7 bar would be 4000 N.

Figure 3:
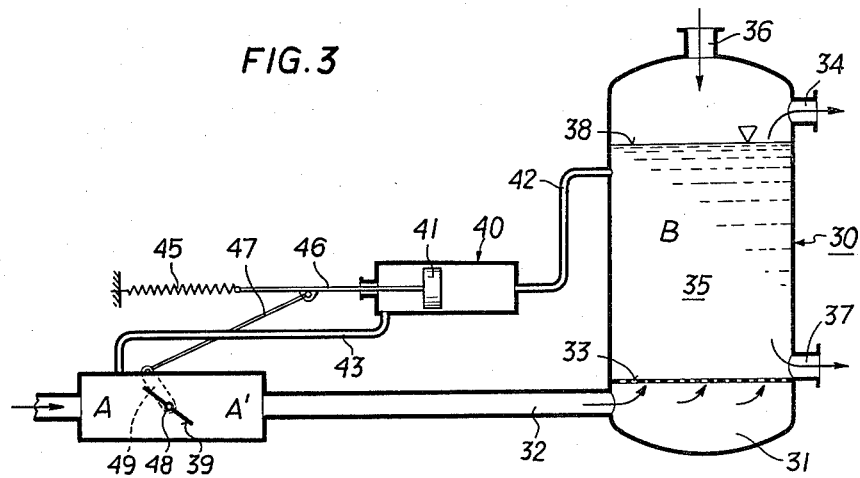
FIG. 3 illustrates another embodiment of the concept of the invention, likewise in diagrammatic form.
Figure 4:
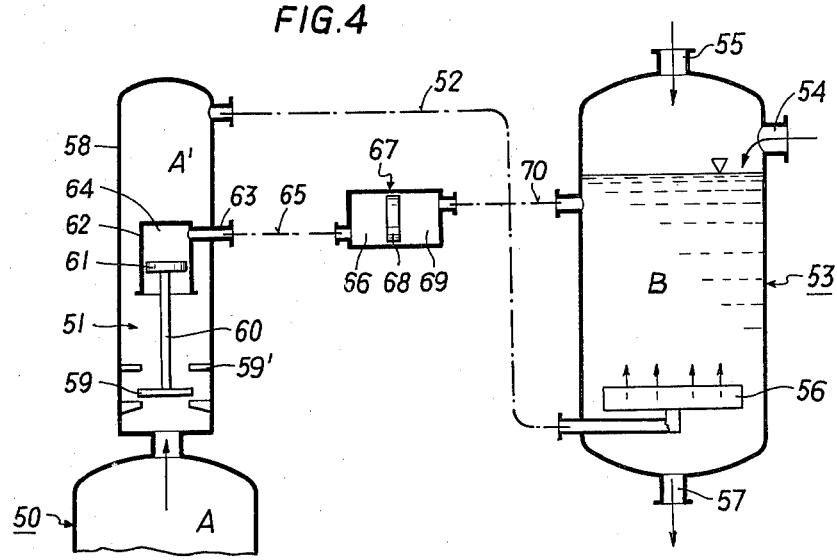
FIG. 4 illustrates a still further embodiment also in diagrammatic illustration.

FIGS. 3 and 4 illustrate other embodiments of the invention. With reference to FIG. 3 it will be seen that 30 indicates a washing column below which is provided a gas-filled chamber 31 in which a gas duct 32 leads. The gas passes through a perforated plate 33 and leaves the column at 34 after flowing in counter current through the wash liquid 35 all of which is above the perforated plate. The wash liquid is introduced at 36 and discharged at 37.

At the place of the perforated plate the liquid and gas have approximately the same pressure. If now the pressure above the liquid level drops suddenly, which for instance could be caused through a breakage in a duct, a large pressure difference would arise at the perforated plate which would cause an increase in the amount of gas percolating through the washing liquid. Thus, imperfectly purified gas could be discharged at 34 or at any possible rupture point.

All this is prevented according to the invention by providing a flap 39 in the gas duct 32. The flap is operated by a cylinder 40. Located in the cylinder is a piston 41 which is acted on by the liquid 35 through a duct 42 on one side, and on the other side by the gas through a gas duct 43. The liquid pressure acting on the piston 41, because of the lesser hydrostatic force of the liquid, is smaller than the gas pressure. Therefore, a spring 45 is provided which normally causes the flap 39 to open. The piston rod 46 for this purpose is connected by means of a link 47 with an arm 40 provided on the axle 48 of the flap 39.

If the pressure upon the liquid level 38 drops, the liquid pressure acting on piston 41 will drop as well. Therefore, the piston is moved to the right by the gas pressure which is subject to a slower drop. This causes the closing of the flap 39.

The embodiment shown in FIG. 4 illustrates an installation for cooling a gas. The gas flows from a space 50 via a valve 51 and a duct 52 into the cooling chamber 53 where it is cooled by a cooling liquid introduced at 54. It then is passed at 55 into a duct, not further shown. The gas flows through a distributer 56 so that an intimate contact between gas and liquid is assured. The cooling liquid is discharged from the chamber 53 at 57.

The valve 51 in this case comprises a housing 58 a valve disk 59, a valve seat 59', a valve rod 60, and a piston 61 which moves in a cylinder 62. This cylinder is open towards the valve disk 59 so that on this side the piston is subject to the action of the gas. The other side of the piston is subject to the action of a liquid introduced through the connection 63. The cylinder space 64 is connected via a duct 65 with the space 66 of a second cylinder 67. In this second cylinder there is a freely movable piston 68 which is subject on one side to the action of a liquid acting as a transfer liquid and impacting on the piston 61 while the other side is subject to the action by the cooling liquid. The cylinder space 69 is connected with the chamber 53 by a duct 70.

The advantage of this embodiment is that the cooling liquid does not act directly upon the piston 61 of the valve 51. This is of value where the cooling liquid may have damaging components. The duct 70 may be very short and the cylinder 67 and piston 68 can be formed of a highly corrosion resistant material. The duct 65 and cylinder 62 on the other hand may be formed of a much cheaper material.

If the pressure now sinks in the system B as explained in connection with FIG. 3, the pressure in the cylinder space 69 will likewise drop just as fast while the pressure in the cylinder space 66 will drop slower because of the expansion of the gas present in the systems A and A'. The pressure in these systems is transmitted through the valve piston 61 to the cylinder space 64 and through the ducts 63 and 65 to the cylinder space 66.

As a consequence of this difference of the pressures, the piston 68 will move to the right in FIG. 4 and the valve piston 61 will move upwards. The weight of the piston 61, of the valve rod 60 and of the valve disk 59 is then eliminated so that the valve 51 is closed.

The system A extends up to the shut-off valve, while the system A' is located between the shut-off device and the liquid phase which forms the system B. The designations A, A' and B for the different systems have been entered in FIGS. 2 to 4.

The invention is not limited to the embodiments shown. It can be used wherever two systems are in connection with each other of which one contains a gaseous medium and the other contains a liquid medium. Because of the fast pressure drop in the liquid system B, a pressure difference forms through the discharge openings from the system A' to the system B. According to the laws of hydrodynamics, each pressure difference corresponds to a certain quantity of steam or gas leaving system A' per unit time.

The pressure drop in the systems A and A' takes place depending on the steam or gas quantity leaving the system A' per unit time, on the volumes of the systems A and A', and on possible post-evaporation processes. Caused by the working capacity of the steam or gas, the pressure in the systems A and A' drops always substantially slower than in the system B so that the pressure difference occurring thereby at the piston can effect the closure of the valve. After closure of the valve, the pressure in system A' adapts to that of system B, whereas a further pressure drop is prevented in system A, and no further medium can pass from system A to system B either. A re-opening of the valve takes place after removal of the disturbance causing the pressure drop in system B, by increasing the pressure in the system B to the operating value. It is not necessary for the pressures in the liquid and in the gaseous phases to be of equal value under normal operating conditions. A certain pressure difference may exist. The device according to the invention responds only to a pre-selected pressure difference.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. An apparatus for pressure regulation between a gaseous or vaporous phase and a liquid phase, the said apparatus comprising
    (a) a first chamber in which there is present a gaseous or vaporous medium under pressure;
    (b) a second chamber filled predominantly with a liquid medium which is at a pressure independent from the pressure in said first chamber;
    (c) an intermediate chamber filled in normal operation with substantially the same gaseous or vaporous medium at substantially the same pressure as present in said first chamber;
    (d) duct means for connecting the said first chamber through said intermediate chamber with said second chamber;
    (e) means for causing a predetermined pressure drop between said intermediate chamber and said second chamber, and
    (f) a piston operated shut-off device adapted to assume an open and a closed position, the said shut-off device being disposed between said first and said second chamber, the pressure of the second chamber acting on the one end of said piston by means of said liquid medium so as to cause the shut-off device to move into the open position and the pressure in said first chamber acting on the other end of said piston so as to cause the shut-off device to move into the closed position, the differential between said two pressures during normal operation causing the shut-off device to remain in the open position and the said pressure differential causing the shut-off device to move into the closed position when the said pressure drop is exceeded by a predetermined value so as to prevent a sudden overrun from the first into the second chamber in case of said excess pressure drop in the second chamber.

2. The apparatus of claim 1 wherein the shut-off valve is disposed at the point of transition from the first to the intermediate chamber.

3. The apparatus of claim 1 wherein the shut-off valve is disposed within the intermediate chamber.

4. The apparatus of claim 1 which includes a duct for passing a waste fluid into said first chamber, the first chamber forming a first-stage evaporator for converting substantially all of said waste fluid into vapor, and wherein the intermediate chamber is a mixing condenser filled with a cooling liquid for reliquefying the vapor generated in said first stage evaporator and wherein means are provided for passing the fluid formed in the condenser into said second chamber, the latter forming a second stage evaporator, and including a discharge for the vapor formed in said second chamber.

5. The apparatus of claim 4 wherein the waste fluid is a radioactive waste fluid and the carriers of the radioactivity normally are not transferred to the steam generated by the evaporation in the first chamber.

6. The apparatus of claim 4 wherein the said shut-off device is in the form of a valve, the pressure of the vapor generated in said first stage evaporator acting on one side of said valve and the liquid pressure from the second stage evaporator acting on the other side of said valve so as to close the passage from said first chamber to said second chamber upon said excessive pressure drop.

7. The apparatus of claim 6 wherein the said valve is provided at one side with a valve disk and at the other side with a valve rod having a pressure face the said rod serving as said piston and the said pressure face being acted on by said liquid formed in the second chamber and the valve disk being acted on by said vaporous medium received from said first chamber and wherein spring means are provided for causing the valve normally to be in the open position unless said excessive pressure drop occurs in said second chamber.

8. An apparatus for pressure regulation between a gaseous or vaporous phase and a liquid phase, the said apparatus comprising
   (a) a first space in which there is present a vaporous medium under pressure;
   (b) a second space filled predominantly with a washing or cooling liquid which is at a pressure independent from the pressure in said first space;
   (c) duct means for connecting the said first space with said second space;
   (d) a piston operated shut-off device adapted to assume an open and a closed position, the said shut-off device being disposed between said first and said second space, the pressure of the second space acting on the one end of said piston by means of said liquid medium so as to cause the shut-off device to move into the open position and the pressure in said first space acting on the other end of said piston so as to cause the shut-off device to move into the closed position, the differential between said two pressures during normal operation causing the shut-off device to remain in the open position and the said pressure differential causing the shut-off device to move into the closed position when the pressure drop is exceeded by a predetermined value so as to prevent a sudden overrun from the first into the second space in case of said excess pressure differential,
   the second space being formed as a container for a washing or cooling liquid, the container having an intermediate permeable partition, an inlet for the gas received from said first chamber being provided below said partition and an inlet for the liquid being provided above said partition and a gas outlet being provided in the top portion of the container, whereby the gas percolates through the said liquid and is discharged through said outlet of the container.

9. The apparatus of claim 8 wherein the shut-off device is in the form of a movable flap to open or close the connection between said first and second chamber and wherein the said piston of the shut-off device is provided with a piston rod and wherein a linkage is provided between said piston rod and said flap to cause the opening or closing of the flap by movement of the piston and piston rod in response to said excessive pressure drop in said liquid.

10. The apparatus of claim 8 wherein the shut-off device includes a first and a second piston movable in separate cylinders and wherein a transfer liquid is provided between one side of the first piston and the corresponding side of the second piston, the other side of the first piston being acted upon by the gaseous medium received from said first chamber and the other side of the second piston being acted upon by the said liquid in said second chamber, whereby the movement of said pistons occurs in response to said excessive pressure drop in said liquid.

* * * * *